Feb. 11, 1969
E. L. STRAUB
3,426,523
ENGINE WITH COMPRESSION BRAKING SYSTEM
Filed Oct. 26, 1966
Sheet 5 of 6
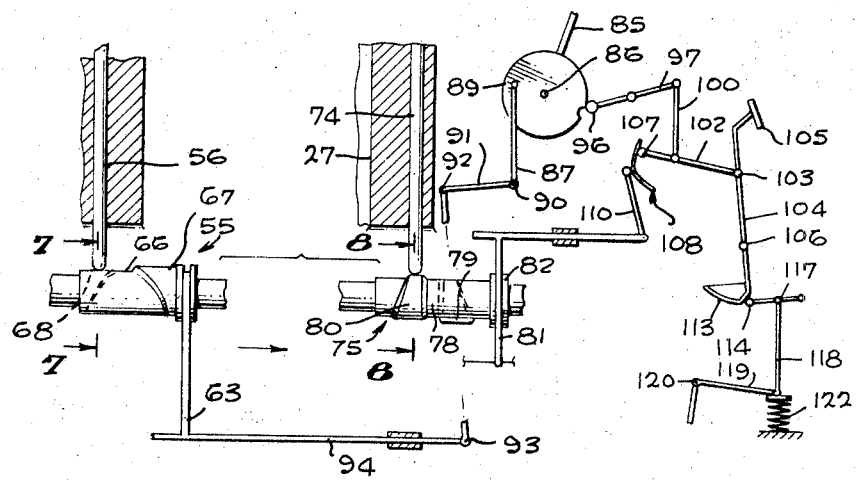
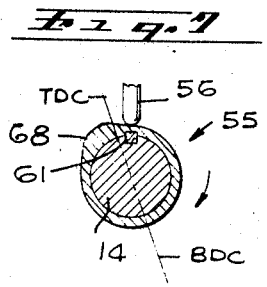
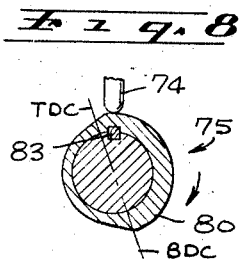
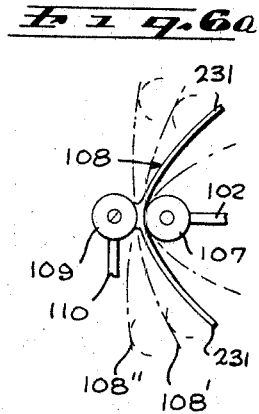
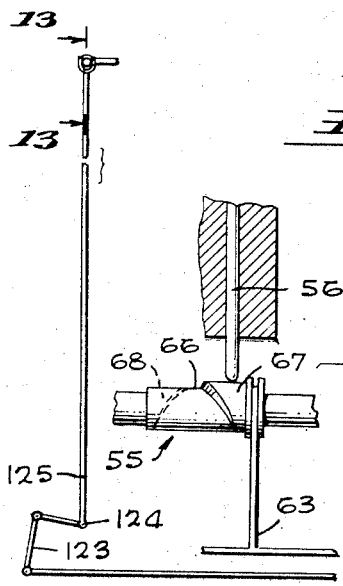
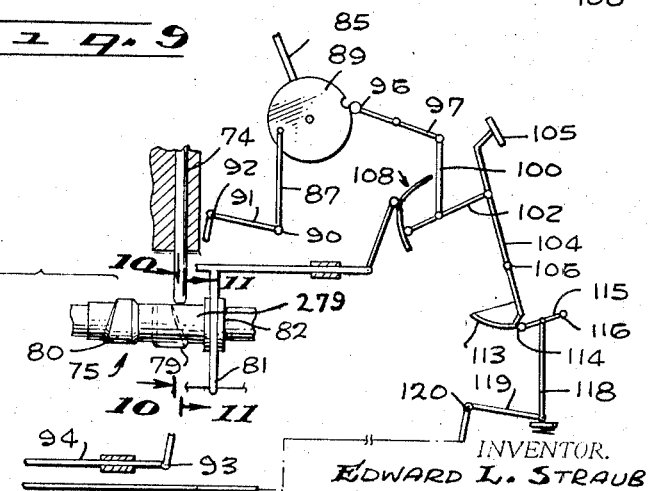
INVENTOR.
EDWARD L. STRAUB
BY William P. Green
ATTORNEY Feb. 11, 1969  E. L. STRAUB  3,426,523
ENGINE WITH COMPRESSION BRAKING SYSTEM
Filed Oct. 26, 1966  Sheet 6 of 6
Fig. 10
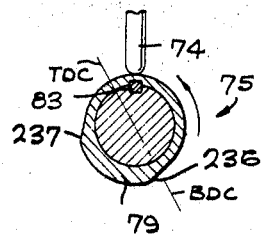
Fig. 11
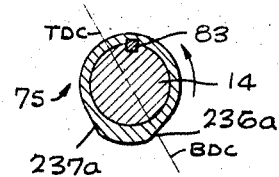
Fig. 12
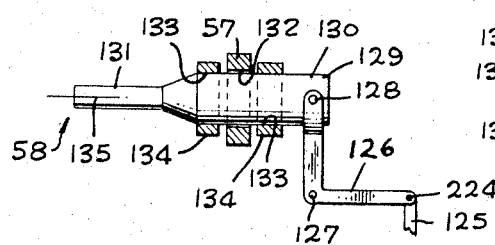
Fig. 13
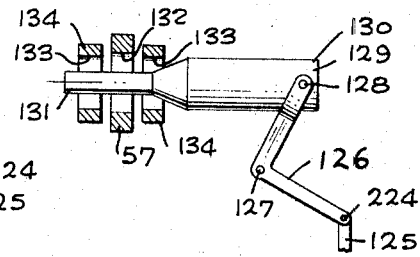
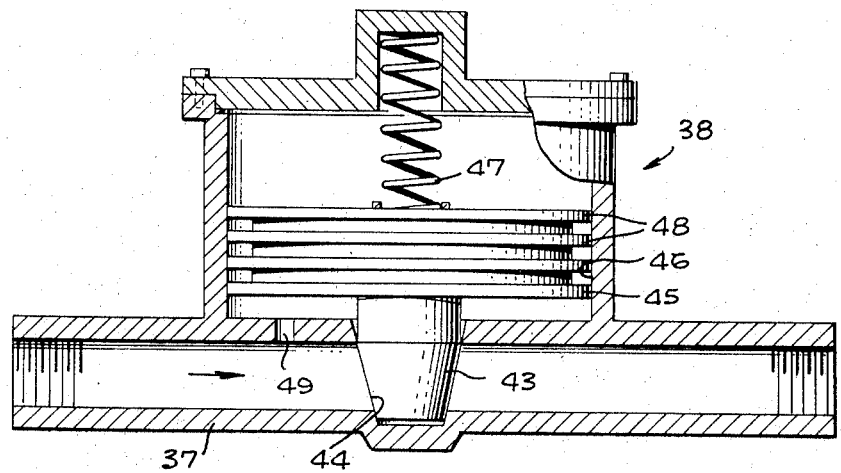
Fig. 14
INVENTOR.
EDWARD L. STRAUB
BY William P. Green
ATTORNEY

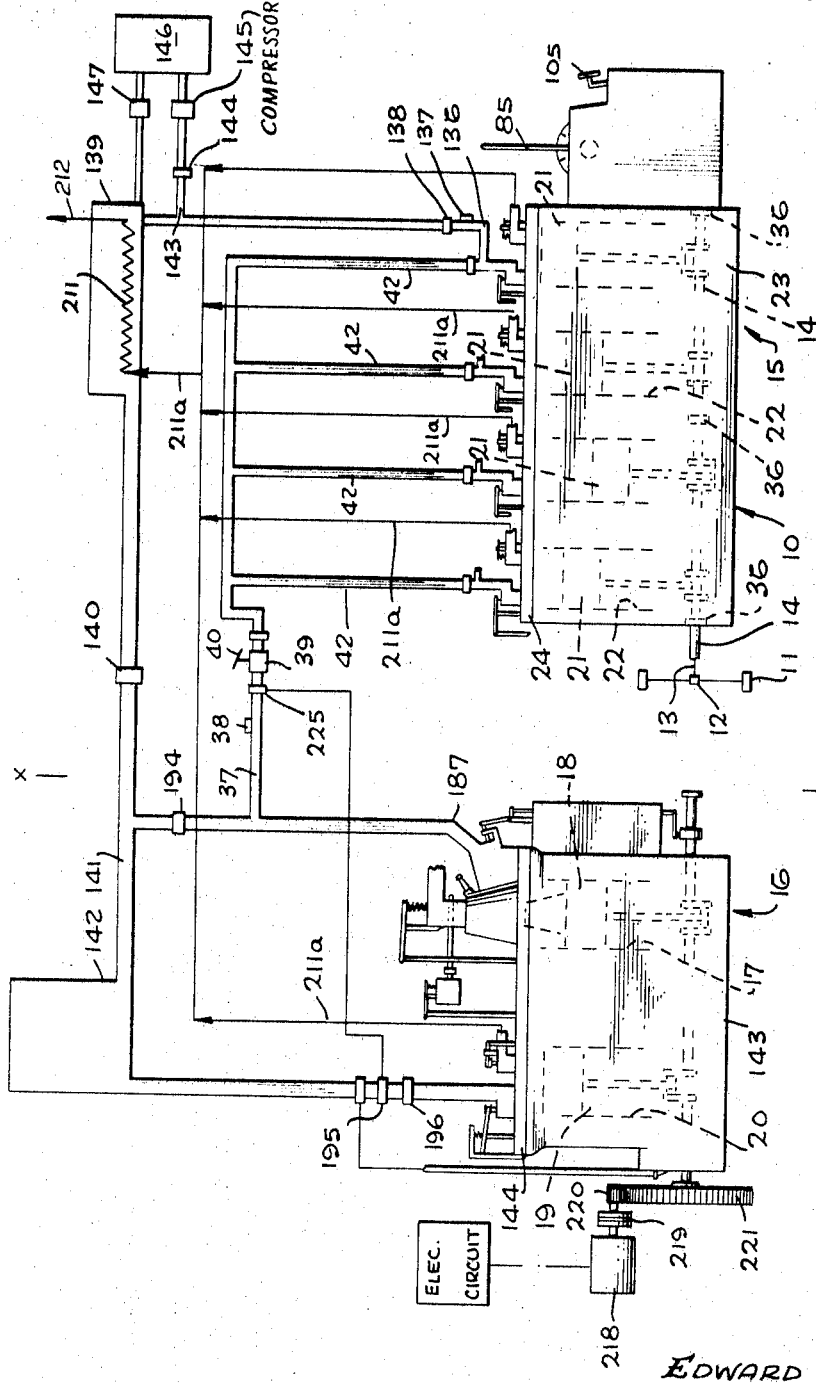

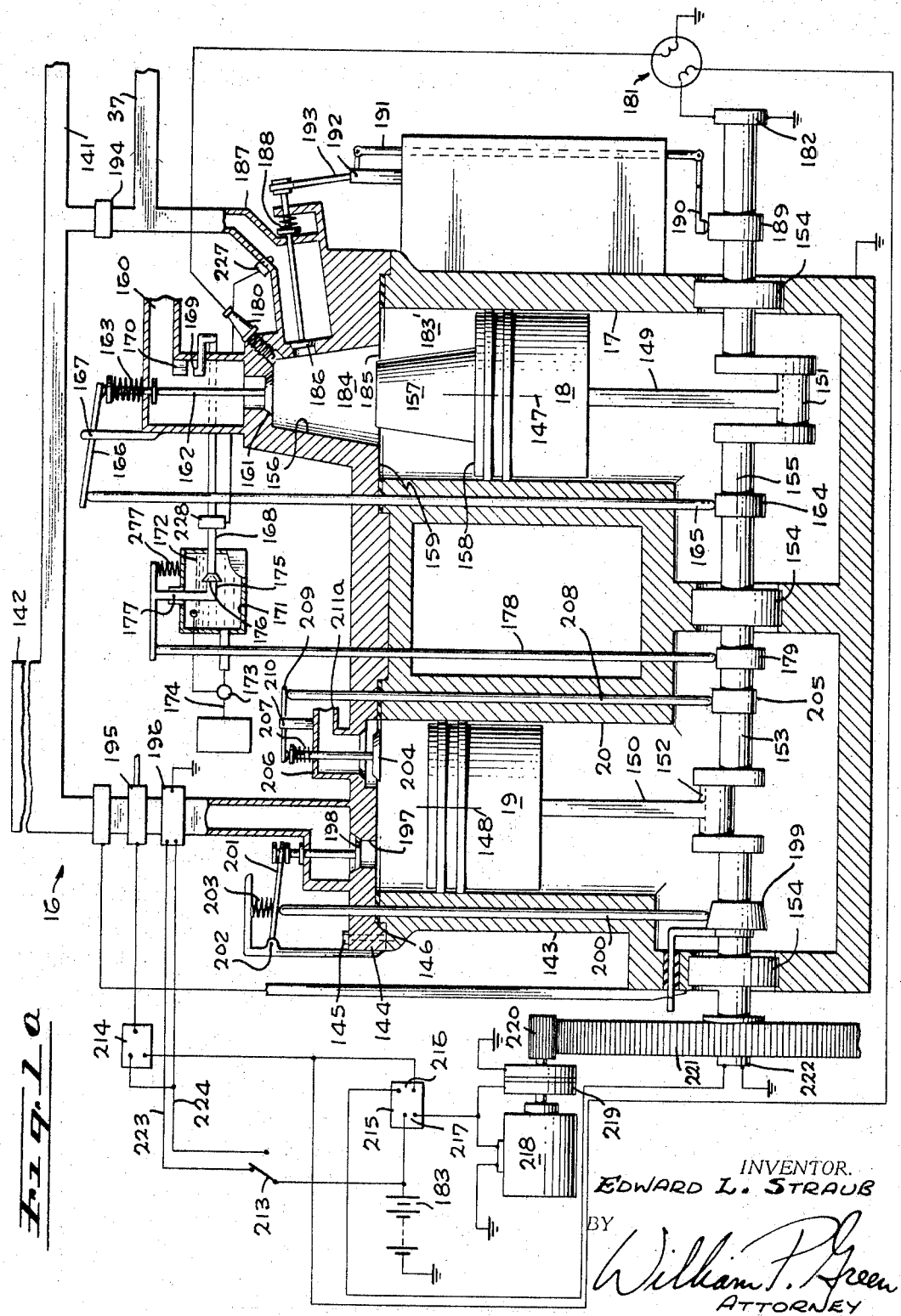

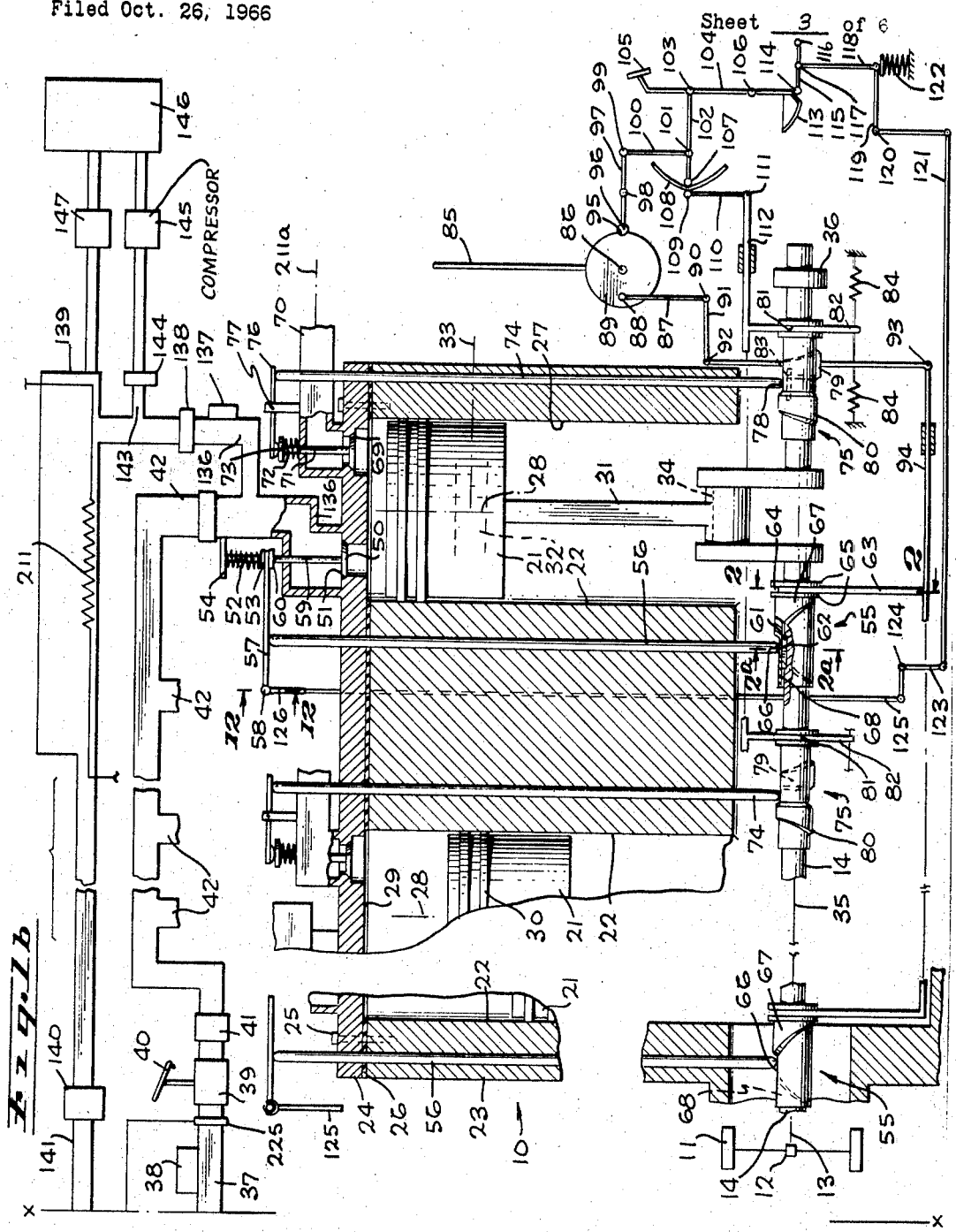

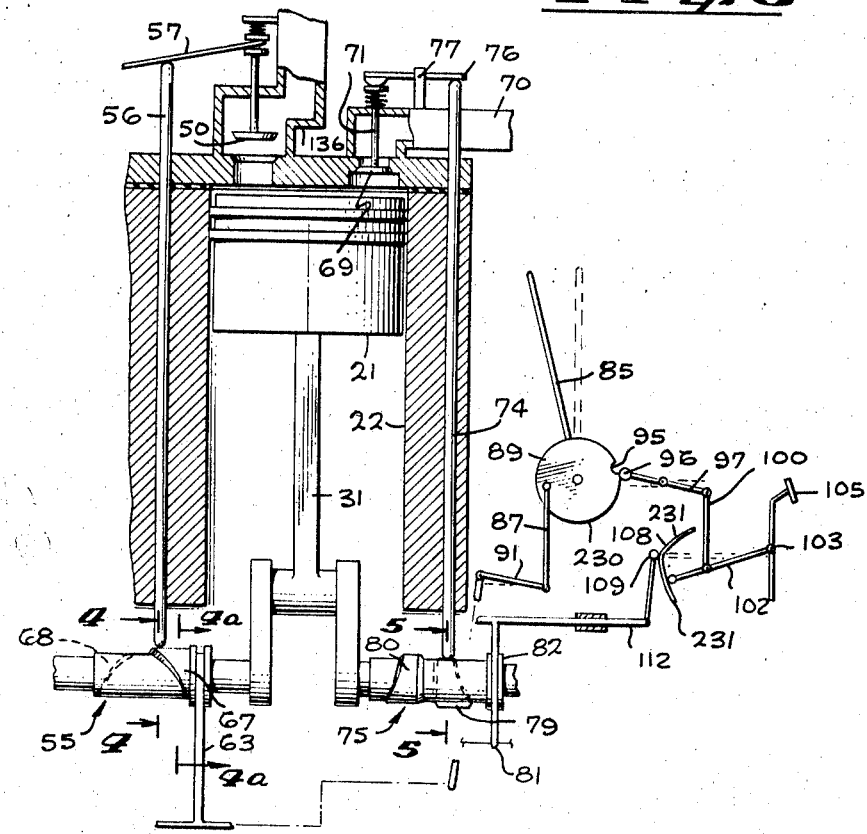

United States Patent Office 3,426,523
Patented Feb. 11, 1969

3,426,523
ENGINE WITH COMPRESSION BRAKING SYSTEM
Edward L. Straub, 1400 N. Buena Vista St.,
Burbank, Calif. 91505
Filed Oct. 26, 1966, Ser. No. 589,728
U.S. Cl. 60—15          26 Claims
Int. Cl. F02b *33/02;* F01b *1/00;* F02d *31/00*

ABSTRACT OF THE DISCLOSURE

A work-brake assembly including a piston and cylinder mechanism whose pistons are in one condition driven by heated gases to produce output power, and in a second condition function as a compressor acting to take in atmospheric air and compress it into a storage container, with the compressing action producing a braking effect on the engine. The heated gases are produced by burning of a fuel-compressed air mixture within the cylinder of a second piston and cylinder mechanism, which is in turn driven by a third piston and cylinder mechanism. The third mechanism is driven by some of the heated gases from the second mechanism, supplemented by air compressed in the first piston and cylinder mechanism when in its braking condition.

---

This invention relates to an improved reciprocating engine structure, and more particularly to an engine which may be converted between a driving condition and a second condition in which the engine pistons function to apply a braking rather than driving force to the output shaft of the engine. The present work-brake system will be described primarily as applied to the driving and braking of an automobile or other motor vehicle, though it will be understood that the invention is also applicable to any of numerous other situations in which both driving and braking effects are desired.

A major object of the invention is to provide a work-brake system which is considerably more efficient thermodynamically than conventional engines utilizing the Otto or Diesel cycles, and which in addition is so designed as to result in substantial overall simplification and reduction in cost of the drive system of an automobile. The unit is preferably so constructed as to eliminate the necessity for provision of a transmission in the drive to the wheels of a vehicle, and further to also eliminate the necessity for a clutch. Thus, the engine may in effect be directly connected to the wheels of the vehicle, without provision for a change in effective gear ratio, and without requiring disconnection of the engine from the wheels by a clutch arrangement at any time.

To achieve these results, the engine is constructed to produce its full driving torque on initial acceleration from a zero speed condition, and to maintain that torque through the entire range of usable speeds, so that the gear ratio changing effect of a transmission becomes entirely unnecessary. Also, the system is constructed to produce its braking effect at any speed, and under complete control of the operator in a manner enabling variation of the braking forces applied from a full braking condition to a very slight braking force, so that any driving conditions which may be encountered can be successfully handled.

A further object of the invention is to provide an arrangement of the discussed type in which the operator can very readily and easily shift back and forth between driving and braking conditions, and between forward and reverse drive conditions, with complete flexibility and safety.

Additionally contemplated is a work-brake system in which the energy which is absorbed by the braking mechanism during a braking operation is converted to a storable condition, and is subsequently utilized in the overall work-brake assembly in a manner avoiding waste of the energy and in effect ultimately applying that energy to the apparatus in its driving condition, to assist in driving the vehicle.

Structurally, a system embodying the invention includes a piston or pistons which are preferably driven by pressurized gas fed to the cylinders within which the pistons are contained in pressurized form, from an external pressurized gas source. In driving condition, these pressurized gases drive the pistons reciprocably, and apply their pressure to the pistons regardless of their rate of motion to attain the desired full torque upon initial acceleration. When braking is desired, the piston and cylinder units are converted to a braking condition, in which they function as compressors, which are driven by the wheels of the vehicle and act to compress air in the cylinders, and desirably deliver that air to a storage chamber from which the air may subsequently be utilized to energize a portion of the overall system, in order to recover the energy of compression. The desired conversion of the reciprocating pistons from driving to braking condition may be effected by use of a unique valve arrangement which in one condition controls the flow of the pressurized gases, and in the other condition controls admission of air to the cylinders, and delivery of the compressed air from the cylinders. While it is within the broad concept of the invention that separate sets of valves may be employed for these two purposes, certain specific features of the invention, which will be discussed in greater detail at a later point in this application, relate to the preferred arrangement in which a single set of valves will function for both of the driving and braking purposes. These valves may be cam actuated in unique manner, by cams which are shiftable between different conditions in accordance with the operation of a forward reverse control lever, a brake pedal, and a throttle, or their equivalent.

The pressurized gases which are delivered to the work-brake cylinder or cylinders are for best results high temperature pressurized gases resulting from the combustion of an appropriate fuel in air. In this connection, I prefer to employ as the source of these gases a gas generator of the type disclosed and claimed in my co-pending application Ser. No. 590,954, filed Oct. 31, 1966, on "Hot Gas Generator." When this type generator is employed, the air which is compressed by the wheel driving pistons in braking condition may be employed for driving the gas generator, as will appear hereinafter. The generator itself is desirably so designed as to produce gases which can vary automatically in volume in accordance with the requirements of the engine, but which will remain uniform in pressure and temperature in spite of the variations in volume or rate of flow.

The above and other features and objects of the invention will be better understood from the following detailed description of a typical embodiment illustrated in the accompanying drawings, in which:

FIG. 1 is a partially diagrammatic representation of a work-brake system embodying the invention;

FIGS. 1a and 1b are enlarged views showing in greater detail the left hand portion and right hand portion respectively of FIG. 1, as divided at the broken line X—X of FIG. 1;

FIGS. 2 and 2a are transverse sections taken on lines 2—2 and 2a—2a respectively of FIG. 1b;

FIG. 3 is a view similar to FIG. 1b, showing the engine in a slow forward drive condition;

FIGS. 4, 4a and 5 are sections taken on lines 4—4, 4a—4a and 5—5 respectively of FIG. 3, through the two control cams associated with one of the wheel driving pistons;

FIG. 6 is a view similar to a portion of FIG. 3, showing the cams in a slow rearward drive condition;

FIG. 6a shows fragmentarily a portion of the cam actuating mechanism;

FIGS. 7 and 8 are sections taken on lines 7—7 and 8—8 respectively of FIG. 6;

FIG. 9 shows the apparatus in a braking condition while travelling forwardly;

FIGS. 10 and 11 are transverse sections taken on lines 10—10 and 11—11 respectively of FIG. 9;

FIG. 12 is an enlarged section taken on line 12—12 of FIG. 1b;

FIG. 13 is a section taken on line 13—13 of FIG. 9; and

FIG. 14 is a section through one of the pressure control valves of the apparatus.

Reference is first made to FIG. 1, which illustrates a work-brake system 15 which it is assumed may be utilized as the driving and braking engine of a motor vehicle, whose driven wheels are typically represented at 11 in FIG. 1. These wheels are driven through the usual differential 12 by a drive shaft represented at 13, which shaft is directly and rigidly connected to and driven by the shaft 14 of the engine proper which is designated generally by the numeral 10 and is shown in enlarged form in FIG. 1b. This engine is driven by hot compressed gases from a gas generator 16 which is shown best in FIG. 1a and may be constructed in accordance with the teachings of my above mentioned co-pending application. Generator 16 contains at least one burning cylinder 17 containing a piston 18 which is driven by at least one piston 19 within a power cylinder 20. The engine and brake unit proper, designated 10, preferably contains a plurality of pistons 21, contained within a plurality of cylinders 22, with the different pistons being timed to apply torque to output shaft 14 at different times during each cycle of rotation of the shaft, in complementary fashion, so that in effect an essentially uniform torque is applied to the shaft as in conventional multicylinder reciprocating engines. In most instances, it is contemplated that four of the pistons 21 will be employed, with the different pistons being 90 degrees out of phase with one another. For simplicity of illustration, however, only one of the pistons 21 and its associated cylinder 22 have been shown in their entirety in FIG. 1b, and only this one piston and cylinder wlil be described in detail, with the understanding that the other pistons and cylinders of unit 10 are similarly constructed and connected to the gas source in parallel to the one cylinder described.

With reference to FIG. 1b, the cylinders 22 of unit 10 are formed within and by a cylinder block 23 having a cylinder head structure 24 secured to the block by head bolts or other fasteners represented at 25, and of course sealed annularly about each cylinder by an appropriate gasket 26. Cylinders 22 are defined by a series of parallel cylindrical side wall surfaces 27 formed in and by block 23 (or appropriate liners within the block) and centered about parallel axes 28 which extend vertically. Head 24 forms at the upper end of each cylinder 22 a transverse end wall surface 29 defining the upper end of the cylinder chamber. Pistons 21 may be of conventional construction, having the usual piston rings 30 which engage the cylinder wall in fluid tight relation. Each piston is pivotally attached to a connecting rod 31, by means of a wrist pin 32, so that the connecting rod pivots relative to the piston about a transverse axis represented at 33. The opposite end of the connecting rod is attached pivotally to an eccentric crank throw 34 on shaft 14, so that the shaft is driven rotatably in accordance with the axial reciprocation of the piston. The shaft itself is mounted to block 23 for rotation about axis 35 by a series of bearings 36.

Hot pressurized gases, typically at a pressure of about 125 pounds per square inch, are fed to the cylinders of unit 10, from gas generator 16 of FIGS. 1 and 1a, through a line 37, which contains a pressure control valve 38 and a manually actuated throttle valve 39 which is adjustable continuously from a fully opened position to a fully closed position by an actuating element 40 typically represented as an accelerator pedal. A check valve 41 is also connected into this line to allow gases to flow to the cylinders, but not reversely into line 37. Beyond check valve 41, line 37 divides into a series of branches 42 leading to the different cylinders respectively.

Pressure control valve 38 may be of any conventional type adapted to prevent the flow of gases rightwardly past this valve until the development of a predetermined gas pressure at the left side of the valve. FIG. 14 shows a typical arrangement for this purpose, including a tapered valving element 43 which in its lowermost position engages a corespondingly tapered frustro-conical seat surface 44 formed in line 37, in a relation blocking the flow of gases past element 43. This element 43 is formed integrally with an enlarged diameter actuating piston 45, which is slidably received within a cylindrical compartment 46, and is yieldingly urged downwardly by a spring 47. Piston 45 of course may have rings 48 for forming an annular seal with respect to surface 46. As will be understood, when the pressure within passage 37 and at the left side of element 43, as communicated to the underside of piston 45 through an opening 49, reaches a predetermined value, say for example approximately the normal operating system pressure of cylinders 22, the piston is urged upwardly to a position in which it opens element 43 to pass gases rightwardly through line 37. The purpose of this pressure control valve is to assure the development at the left side of element 43 of sufficient pressure to enable proper starting and other operation of the gas generating system, prior to delivery of any of the produced gases to the cylinders of unit 10.

The admission of the hot pressurized gases into each of the cylinders 22 is controlled by a poppet valve 50 (FIG. 1b), which seats downwardly against a seat 51 formed in head 24, and is spring urged downwardly to its closed position by a coil spring 52. This spring may bear downwardly against a shoulder 53 formed on the valve stem 59, and bear upwardly against a backing structure 54 which is secured stationarily to head 24.

Valve 50 is actuated mechanically by a specially constructed cam 55 mounted on and turning with shaft 14. More particularly, the cam acts to displace upwardly a follower or push rod 56, whose upper end bears upwardly against a rocker arm 57 fulcrumed at 58. The opposite end of rocker arm 57 is confined between shoulder 53 on the stem 59 of valve 50, and a second shoulder 60 on that stem, so that upward swinging movement of the rocker arm about its fulcrum location 58 acts to displace valve 50 upwardly to open position, against the tendency of spring 52.

Cam 55 is essentially tubular and disposed about externally cylindrical shaft 14, and is slidable axially along the shaft between different camming positions. To transmit rotation from the shaft to cam 55 in its different axial settings, the shaft may carry an axially elongated key 62, which is a tight fit within an axial groove 362 in the shaft, and which is slidably received within an axial groove 61 in the cam. The cam is actuated axially by a yoke 63 (FIGS. 1b and 2) which is received and confined within an annular groove 64 formed between a pair of flanges 65 on the cam, so that the yoke may move the cam axially without interfering with rotation of the cam relative to the yoke.

At approximately its center, cam 55 has an outer surface portion 66 which is cylindrical and centered about axis 35 of the shaft, so that when push rod 56 engages this portion of the cam (as in FIG. 1b), the push rod remains in a set position and is not actuated by rotation of the cam. In this condition, valve 50 is closed. To the right of its central or neutral area 66, cam 55 has a lobe or protrusion 67 which becomes effective to actuate push rod 56 and valve 50 during forward operation of the vehicle. A similar but reversed lobe 68 is provided to the left of neutral area 66 for controlling valve 50 upon rearward motion of the vehicle. The precise configuration of these lobes 67 and 68 will be brought out at a later point in describing the operation of unit 10.

Discharge of the heated gases from cylinder 22 is controlled by a second valve 69, past which the gases may flow through a line 70 to atmosphere. During the braking operation of the apparatus, air flows in a reverse direction through line 70 from atmosphere and past valve 69 into cylinder 22. Valve 69 has a stem 71, about which there is disposed a spring 72, which acts upwardly against a shoulder 73 on the stem to yieldingly urge the valve 69 to closed position. The valve is opened mechanically by upward movement of a push rod 74 under the influence of a second cam 75, with the push rod serving to actuate the valve through a rocker arm 76 fulcrumed at 77 to the cylinder head 24. Valve stem 71 is not connected to rocker arm 76, but merely bears thereagainst, so that valve 69 may be opened downwardly without actuation of the rocker arm during braking or compressor type operation of the apparatus.

Cam 75 has a central externally cylindrical neutral area or surface 78, centered about axis 35, and at which there is no actuation of push rod 74. To the right and left respectively of this neutral area 78, the cam has two lobes 79 and 80, whose exact configuration will be brought out at a later point, and which are utilized during forward and rearward movement respectively of the vehicle. As in the case of cam 55, the second cam 75 has an annular groove 81 which receives a yoke 82 by which the cam is actuated axially relative to the shaft, with the cam being keyed to the shaft for rotation therewith by a key 83 constructed the same as the previously mentioned key 62. The cam 75 may be yieldingly retained in its FIG. 1 neutral position by springs represented at 84.

Unit 10 is actuated between forward and reverse drive conditions by swinging movement of a control lever 85 about an axis 86 which is fixed relative to the block 23 of unit 10. This lever actuates cam 55 through a mechanism which includes a link 87 pivoted at 88 to a circular mounting portion 89 of lever 85, and pivoted at 90 to one arm of a bell crank 91 which is pivoted at a fulcrum location 92 fixed with respect to block 23. The second arm of the bell crank is pivoted at 93 to a longitudinally slidable rod represented at 94 which is rigidly connected to and actuates yoke 63. Thus, leftward movement of the upper end of lever 85, as viewed in FIG. 1, causes downward movement of link 87, clockwise pivotal movement of bell crank 91, and bodily leftward movement of rod 94 and yoke 63, to thereby actuate cam 55 leftwardly along shaft 14 to a position in which lobe 67 of the cam comes into contact with push rod 56. Similarly, rightward swinging movement of the upper end of lever 85 moves lobe 68 of cam 55 into engagement with push rod 56, to actuate it.

At the right side of mounting portion 89 of lever 85, this portion contains a notch 95, which in the neutral condition of the lever receives a roller 96 on the end of a lever 97 which is pivoted at a fulcrum point 98 fixed with respect to the block of engine 10. The second end of lever 97 is pivoted at 99 to a link 100, whose lower end is pivoted at 101 to an elongated rod or member 102. This rod 102 is in turn pivoted at 103 to a mounting arm 104 of a foot actuated brake pedal 105. The brake pedal is mounted to swing about a fixed fulcrum point 106, to thus shift member 102 leftwardly upon leftward depression of the brake pedal. At its left end, member 102 carries a roller 107 which is engageable with a curved rigid element 108 pivoted about a fixed fulcrum point 109 to swing between the full line and broken line positions of FIG. 6a. Rigidly connected to the curved member 108 is an element 110, which is pivoted at 111 to a member 112 connected to and adapted to actuate yoke 82.

The lower end of the pedal mounting arm 104 carries a cam 113 which, upon counterclockwise pivotal movement of pedal 104–105 about axis 106, acts to deflect downwardly the left end 114 of a lever 115 which is mounted to pivot about a fixed fulcrum point 116. An intermediate portion of this lever is connected pivotally at 117 to a link 118, which acts through a bell crank 119 pivoted at a fixed fulcrum point 120 to displace leftwardly a member 121 in response to downward deflection of element 115. A spring 122 may be provided for resisting this motion. The left end of member 121 in turn acts through a bell crank 123 pivoted at 124 to move downwardly a vertically extending rod 125, whose upper end is pivotally connected at 224 to another bell crank 126 pivoted about a fixed fulcrum point 127 (FIG. 12). The second end of bell crank 126 is pivoted at 128 to an end of a rocker arm pin 129, having an enlarged diameter portion 130 and a reduced diameter portion 131. In the normal operation of the apparatus as an engine driving the vehicle, externally cylindrical portion 130 of rocker arm pin 131 extends horizontally through an opening 132 in an end of rocker arm 57 (FIGS. 1b and 12) and corresponding openings 133 in two stationary mounting brackets 134 rigidly attached to the cylinder head 24, in a relation mounting rocker arm 57 for pivotal movement about a fixed horizontal axis 135 relative to the cylinder head, so that the rocker arm in that condition may actuate valve 50 in accordance with operation of push rod 56. When, however, member 125 moves downwardly in FIG. 1b, and accordingly swings bell crank 126 of FIG. 12 in a clockwise direction (to the position of FIG. 13), the reduced diameter portion 131 of pin 129 moves into openings 132 and 133, and is sufficiently reduced in diameter to avoid any actuation of valve 50 from its closed position as a result of any upward movement of push rod 56 by cam 55, regardless of the axial positioning of the cam. Thus, the described linkage acts upon the initial swinging movement of brake pedal 105 in a leftward brake applying direction to immediately deactivate rocker arm 57 in a manner thereafter preventing cam induced actuation of valve 50, so that valve 50 is thereafter, during the braking operation, controlled only by its spring 52 and the gas forces exerted against the valve (in spring pressed check valve fashion). The manner in which the lever 85 and pedal 105 of FIG. 1b control cam 75 will be discussed in greater detail at a later point.

During braking operation of the unit or engine 10, atmospheric air is admitted to each cylinder 22 past its valve 69 on the downstroke of the associated piston 21, and is discharged from the cylinder past its valve 50 on the piston upstroke, with these two valves operating as check valves and being opened automatically by the pressure changes induced by movement of the piston. The air thus compressed flows into a line 136, and past a second pressure control valve 137 which may be constructed the same as the previously described valve 38 of FIG. 14. The pressurized air next passes through a check valve 138 into an air storage tank 139, from which the pressurized air may flow past another check valve 140 into a line 141 leading to an accumulator tank 142 (FIG. 1a) from which gas generator 16 draws gases for driving its piston 19. Normally tanks 139 and 142 are maintained pressurized at all times, except when the apparatus is initially started from a nonpressurized condition. If the braking condition is continued long enough to tend to develop excessive pressure within tank 139, some of the excess air beyond a predetermined maximum pressure may be bled from line 136 through a line 143, past a pressure relief valve 144 which opens automatically when the predetermined excessive pressure is attained, and to a compressor 145 which is driven by the air and acts to compress air to a still higher pressure and deliver the output into a high pressure storage tank 146. This very highly compressed air may subsequently be drawn off as needed into the lower pressure tank 139, by the automatic action of a pressure regulator valve 147 which acts to admit air into tank 139 up to the predetermined pressure.

With reference now to the structure of the gas generator 16 of FIGS. 1 and 1a, the cylinders 17 and 20 of this gas generator may be formed within a single unitary cylinder block 143, having a cylinder head structure 144 suitably retained by bolts 145 or the like, and sealed by gaskets 146. The two cylinders 17 and 20, and their pistons 18 and 19, are centered about parallel axes 147 and 148. These two pistons are attached by connecting rods 149 and 150 to eccentric crank throws 151 and 152 of a common shaft 153 which is appropriately mounted by bearings 154 for rotation about an axis 155 perpendicular to axes 147 and 148. Thus, a reciprocal motion of piston 19 acts to drive piston 18.

The burning cylinder is shaped to have a frustro-conical upwardly extending head cavity 156 within which there is received in closely fitting relation on upwardly projecting frustro-conical projection 157 which extends upwardly from the main portion of piston 18. At the lower end of projection 157, the piston has a transverse annular upwardly facing surface 158, which is opposite a downwardly facing annular transverse head surface 159. Air enters cylinder 17 through an inlet passage 160, under the control of a poppet valve 161 having a stem 162 which is yieldingly urged upwardly to closed valve condition by a spring 163.

The valve 161 is opened by a cam 164, which acts at appropriate inlet intervals to displace upwardly a push rod 165, acting through a rocker arm 166 pivoted to the cylinder head at 167 to force the valve downwardly to its open position. Desirably valve 161 opens at top dead center and closes at bottom dead center.

An appropriate burnable liquid fuel, such as unleaded gasoline, diesel fuel, or the like, is injected into the inlet air stream through a line 168 whose end 169 projects into the air passage and has an upwardly facing opening beneath an air block 170. The air stream passes about air block 170 creating a low pressure area beneath the air block acting to draw the fuel into the air stream in a highly atomized condition.

Line 168 takes suction from a fuel float chamber 171 within which liquid fuel may be maintained to a level 172 by a float controlled valve 173 connected into a suitably pressurized fuel inlet line 174. A valve element 175 coacts with a conical tapering valve seat surface 176 formed on an end of line 168 to open and close line 168 for entry of the fuel thereinto past valve element 175. This valve element is pivoted at 177 to swing about that pivot point in an opening direction (and against the influence of a sprig 277) in response to upward movement of a push rod 178 by a second cam 179 carried by shaft 153. Thus, cam 179 starts and stops the flow of fuel into air passage 160 at appropriate intervals.

The fuel thus delivered into the cylinder is burned by ignition of a spark plug 180, to which power is supplied at timed intervals from the high tension side of an ignition coil 181, whose low tension side is connected in series with a conventional breaker assembly 182. The contacts or points of assembly 182 are driven by shaft 153, and act to make and break the circuit from a battery 183 in timed relation to the rotation of the shaft.

Fuel inlet valve 175 is so actuated as to be closed during the initial portion of the downstroke of piston 18, so that only pure air passes into the cylinder during that initial portion of the downstroke, following which valve 175 opens to admit fuel into the air during the final portion of the downstroke and until the piston reaches the FIG. 1a bottom dead center position. As a result, the annular region or space 183' between head shoulder 157 and piston shoulder 158 is filled primarily with air, or at least with a great excess of air over that required for an optimum burnable mixture, while the region 184 between the upper end of piston projection 157 and the top of the cylinder cavity 156 is filled with a properly proportioned burnable mixture of fuel and air. These two regions are separated by the more restricted annular space 185 between the piston projection and the side wall of the head cavity.

During the upward stroke of the piston, both the air in space 183 and the burnable mix in space 184 are compressed. Just prior to top dead center, spark plug 180 fires to burn the mix (say from about 12 degrees before top dead center to five degrees before top dead center). The resulting great increase in pressure opens a gas discharge valve 186 connected into a gas outlet line 187 leading from the side of the frustro-conical head cavity. This valve is spring pressed to its closed condition by a spring 188, and is opened by the pressure of the gas just before top dead center to release the highly pressurized hot gases into line 37. The positioning of fuel inlet 169 at the right side of the air inlet passage, closely adjacent the spark plug 180, assures the presence of enough fuel at the spark plug location to cause ignition. Similarly, the positioning of outlet valve 186 near the spark plug assures that all of the burned gases will be scavenged from the system, and that the compressed air from space 183' will then flow from the outlet behind the gases in scavenging relation, and will be given ample opportunity to completely burn all of the fuel in the charge, by reason of the excessive air present in the system.

Valve 186 is opened only momentarily, and then closes at about top dead center, following which inlet valve 161 again opens to take another charge of air and fuel into the system during the downstroke of the piston. The gas induced opening of valve 186 may be aided mechanically by a cam 189, which acts through a rocker arm 190 to move a rod 191 downwardly, which rod acts to pivot about a fulcrum 192 a bell crank 193 connected in operative relation to the stem of valve 186. Cam 189 may be so ground as to open valve 186 only momentarily just prior to the arrival of the piston at top dead center.

The gases from outlet 187 flow through line 37 to the engine or unit 10 (FIG. 1b), to drive it, and some of the gases also flow through a check valve 194 into line 141 to pressurize accumulator 142. This pressure is of course supplemented by compressed air from tank 139, when such compressed air is present, as previously discussed.

The gases from accumulator 142 flow through a pressure controlled throttle 195 and a stop valve 196 into cylinder 20 through an inlet 197 under the control of a valve 198 which is actuated by a cam 199 on shaft 153. Cam 199 actuates the valve through a push rod 200 which acts against a lever 201 pivoted about a fixed fulcrum point 202, and yieldingly urged downwardly by a spring 203. Cam 199 opens valve 198 when piston 19 is in its top dead center position, to admit gases acting to force the piston downwardly, and remains open through just enough of the downstroke of the piston to assure ultimate substantially complete expansion of the gases by the time the piston reaches bottom dead center. At bottom dead center, an outlet valve 204 is opened by cam 205 on shaft 153, to allow discharge of the gases through an outlet line 206 to atmosphere, until valve 204 closes again at top dead center. Valve 204 may be spring urged to closed position by a spring 207. The cam may act upwardly against a push rod 208, which acts through a rocker arm 209 pivoted at 210 to displace the valve stem downwardly, but leaving the valve stem free for opening movement against its spring 207 without rocker arm movement. It is noted that the exhaust gases from line 206 and from line 70 of unit 10 may both be taken through a coil 211 in tank 139 (FIG. 1b), and in heat exchange relation with the compressed air in that tank, to cool the gases and heat the air in a manner recovering some of the heat energy which might otherwise be lost from these gases. To avoid undue complication of the drawings, the lines 211a for conducting such exhaust gases to coil 211 have been shown only fragmentarily in FIGS. 1a and 1b, but are shown more completely in FIG. 1. Coil 211 discharges directly to atmosphere at 212 (FIG. 1), so that air may be taken through lines 211a into the discharge sides of cylinders 20 and 22 when necessary, and especially during the compressor type operation of unit 10.

The electrical circuit for controlling the operation of the apparatus includes an on-off switch 213, and a switch 214 which is actuated by pressure controlled valve 195, to be closed when the valve is open, and vice versa. The circuit also includes a starter relay 215 having primary terminals 216 and secondary terminals 217, a starter motor 218, a magnetic clutch 219 between the starter motor and a gear 220 for driving fly wheel 221, and a switch 222 which is responsive to rotation of the fly wheel, and opens automatically when the fly wheel reaches a predetermined rate of rotation greater than starting speed.

To now describe a complete cycle of operation of the apparatus, assume that the system is initially completely unpressurized, and is stationary, and that switch 213 is in its full line position of contact with lead 223. In this condition, stop valve 196 is maintained closed by current from battery 183, to thus completely shut off the flow of any gases to cylinder 20. When the operator turns switch 213 to its second position of engagement with lead 224, current from the battery acts to open stop valve 196, and also passes through a circuit including switch 214, the primary side of starter relay 215, and switch 222, so that current is fed through the secondary side of starter switch 215 to both the starter motor 218 and magnetic clutch 219, in a manner commencing rotation of fly wheel 221 and its connected shaft 153 and pistons. This rotation causes piston 18 of the burning cylinder to move upwardly and downwardly, and to draw first air and then an air-fuel mixture into the cylinder 17, followed by compression of those charges and ultimate ignition upon firing of the spark plug 180 just prior to top dead center. The resulting gases of combustion open valve 186 and flow past check valve 194 into accumulator 142. At this time, valve 38 is closed because the pressure required to open it has not as yet been attained. A few turns of the shaft will be sufficient to generate enough gases in accumulator 142 to commence powered operation of piston 19. That is, upon downward movement of this piston, the gases are admitted through inlet valve 198 into cylinder 20, to force the piston downwardly, and upon upward movement of the piston, valve 198 is closed, and valve 204 is opened, to discharge the expanded gases through line 206. If the gases expand to atmospheric pressure before the piston reaches bottom dead center, valve 204 may automatically open against the tendency of spring 207, to prevent the necessity for performing negative work against a vacuum condition in the cylinder. As soon as the gases from accumulator 142 are driving piston 19 fast enough to open switch 222, the starter 218 and magnetic clutch 219 are automatically de-energized, so that thereafter the shaft 153 is driven only by the gases. When the gas pressure reaches a great enough value to open pressure controlled valve 38, the gases flow past this valve and are available for admission to unit 10 past throttle 39. A pressure sensing element 225 communicates with the interior of line 37 just ahead of the throttle valve 39, and is connected to pressure controlled valve 195 to actuate that valve in response to variations in pressure in line 37. Thus, valve 195 automatically throttles the admission of pressurized gases to cylinder 20 in a manner regulating the rate of operation of piston 19 and the driven piston 18 to exactly the right speed to always maintain a predetermined and optimum gas pressure in line 37, regardless of the rate of gas flow through that line, and the volume of gases utilized by unit 10. The temperature of these gases is regulated automatically by a thermostatic element 227 (FIG. 1a) which has a sensing part projecting into gas discharge passage 187 leading from burning cylinder 17, with this thermostatic element acting to regulate a fuel control valve 228 in a manner admitting just sufficient fuel into the burning cylinder to always maintain a predetermined optimum temperature of the gases in line 226, again regardless of the rate of operation of the apparatus or the volume of gases generated or used.

After the system has been brought up to pressure, an operator may commence forward movement of the vehicle by moving the forward-reverse lever 85 in a leftward direction as viewed in FIG. 1, as for instance to the slow forward drive position of FIG. 3, followed by opening of throttle 40 either partially or wholly. The movement of lever 85 to the FIG. 3 position acts through linkage 87-91-94 to shift cam 55 leftwardly to its FIG. 3 slow forward drive position. Also, this movement of portion 89 of the lever displaces notch 95 relative to roller 96 in a manner moving the roller upwardly as seen in FIG. 3 to engage the outer cylindrical surface 230 of portion 89. This causes lever 97 to move member 100 downwardly, and to swing member 102 downwardly about pivot point 103. The two curving ends or arms of member 108 gradually decrease in radius with respect to axis 103 as they advance toward the extremities 231 of these arms or portions, and as a result the mentioned swinging movement of member 102 to the FIG. 3 position causes slight clockwise pivotal movement of member 108 about its fixed fulcrum point 109 (as to broken line position 108' of FIG. 6a), to thus displace or shift cam 75 leftwardly to its FIG. 3 position.

FIGS. 4 and 5 show in cross section the portions of cam lobes 67 and 79 which engage and actuate push rods 56 and 74 in the FIG. 3 setting of lever 85. It is noted that in this setting, lobe 67 of cam 55 is very short circularly, and acts to open valve 50 at top dead center (TDC) of piston 21, and then close valve 50 somewhat beyond top dead center, say for example about 20 degrees beyond that point. Thus, a small charge of gases is admitted into the upper end of cylinder 22, during the initial portion of the downward movement of piston 21, to force the piston downwardly, with these gases expanding during the remainder of the downstroke to reach a fully expanded condition before the piston reaches bottom dead center (BDC). From FIG. 5 it will be apparent that valve 69 is closed during the entire downstroke of the piston, but opens at bottom dead center to allow escape of the gases from cylinder 22 during the upstroke of the piston. The valve setting is thus such as to admit small charges of heated gas to the cylinder, and cause slow forward movement of the vehicle. If lever 85 is actuated further to the left in FIG. 1, this results in correspondingly greater leftward displacement of cam 55, but not of cam 75. As push rod 56 engages a portion of the lobe 67 which is further to the right, as for instance at the plane 4a—4a of FIG. 3, the effective circular length of the engaged portion of lobe 67 increases (FIG. 4a) so that valve 50 is maintained open for a greater interval. Thus, the speed of operation of unit 10 and its torque increase. In the fastest speed and highest torque position, cam 55 may typically maintain the inlet valve open from top dead center to about 150 degrees beyond top dead center, as indicated by the extremity 235 of the circularly longest portion of lobe 67. The speed and torque may also be regulated by leaving lever 85 in a desired setting, and adjusting throttle 40 to vary the rate of flow of the gases into the cylinders. Preferably, efficiency is maximized by so adjusting lever 85 and throttle 40 that the gases admitted into the cylinder expand to atmospheric pressure by the time the piston reaches the end of its stroke. When unit 10 is first started (assuming a four cylinder unit 10), lever 85 is first moved to a position in which the lobe 67 of each of its cams 55 maintains the corresponding inlet valve 50 of one of the cylinders open through about 95 degrees of rotation, so that at least one of the cylinders is driving the shaft 14 at every rotative position of the shaft.

When reverse rotation of shaft 14 is desired, for backing of the vehicle, lever 85 may be swung rightwardly to the slow reverse position of FIG. 6, to cause rightward shifting movement of cam 55, and to swing roller 96 downwardly and thereby swing member 102 upwardly in a manner pivoting member 108 in a counterclockwise direction and shifting cam 75 rightwardly to engage the initial portion of lobe 80. As seen in FIG. 7, the portion of lobe 68 of cam 55 which is then engaged by push rod 56 is shaped the same as the portion of lobe 67 which is engaged in FIG. 4, but is reversed with respect thereto, so that upon reverse rotation of the shaft, lobe 68 acts to open inlet valve 50 through a short interval just beyond top dead center (say for example 20 degrees), to drive the engine at a slow speed but reversely. Also, as seen in FIG. 8, lobe 80 of cam 75 opens the exhaust valve 69 during the upstroke of the piston, to exhaust all of the gases. Further rightward movement of lever 85 causes push rod 56 to engage a portion of lobe 68 which has an increased circular extent (corresponding to the FIG. 4a position for forward rotation), to still open the valve 50 at top dead center, but to maintain it opened for an increased and controllable length of time. Thus, lobe 68 is the same as lobe 67, but reversed, and acts upon rightward movement of cam 55 to progressively increase the rate of speed to a maximum in the reverse direction. Such increased movement of lever 85, however, does not move cam 75 beyond the FIG. 6 position, nor does movement of lever 85 in the leftward direction beyond the FIG. 3 position act to displace cam 75 beyond its FIG. 3 position, all by virtue of the fact that once roller 96 of lever 97 has contacted the increased diameter portion 230 of the lever structure, further movement of the lever will not actuate the roller to an increased extent.

Assume now that the lever is in the FIG. 3 slow forward drive condition, and that the vehicle is moving forwardly, but that it becomes desirable to brake the vehicle. In this circumstance, throttle 40 is closed and lever 85 is left in its forward drive position while the operator presses on pedal 105 of FIG. 1b, to actuate the pedal to its FIG. 9 position by pivotal movement about fulcrum point 106. This movement of the pedal causes member 102 to press leftwardly against the lower end of curved member 108, and thus to pivot that member in a clockwise direction to the FIG. 9 setting, with resultant increased leftward movement of cam 75 beyond the FIG. 3 setting (as to broken line position 108" of FIG. 6a). Push rod 74 then engages a changed portion of lobe 79 of cam 75, as seen in FIG. 10. In that condition, the push rod still engages a leading portion 236 of lobe 79 just beyond bottom dead center (as in FIG. 5), but now moves off of the lobe at a point 237 which is considerably in advance of top dead center, and in advance of the point 238 of FIG. 5 at which the push rod leaves lobe 79 in the forward driving condition of the apparatus. Thus, valve 69 is not maintained open by cam 75 during the last portion of the upstroke of the piston. Also, as previously described in detail, the initial counterclockwise pivotal movement of pedal 105 about fulcrum 106 in FIG. 9 acts through cam 113 and the connected linkage 115, 118, 119, 121, 123, and 125, to retract rocker arm pin 129 of FIG. 12 to its FIG. 13 position, in a manner deactivating cam 55 to prevent actuation of valve 50 by that cam.

As a result, valve 50 and valve 69 both act as spring pressed compressor valves, except for the fact that valve 69 is maintained open during the interval represented in FIG. 10 in which lobe 79 contacts push rod 74. Thus, during the period from top dead center to bottom dead center, downward movement of the piston causes valve 69 to open in a manner admitting atmospheric air into the cylinder chamber above piston 21. When the piston reaches bottom dead center, valve 69 is opened mechanically by lobe 79 of cam 75, as will be apparent from FIG. 10, so that the entrapped air within the cylinder may escape past valve 69 until the push rod 74 moves off of lobe 79 at the location 237 of FIG. 10. At that position, valve 69 closes, to entrap the remaining air within the cylinder, and compress that air by further upward movement of the piston. This compressed air forces opening of valve 50 against the tendency of its spring 52, so that a limited amount of air is compressed into line 42. On successive cycles, additional air is compressed, to ultimately force opening of control valve 137 and check valve 138, and commence the storage of compressed air in tank 139, ultimately to be delivered to accumulator 142 as required. The compressing effect of piston 21 acts to resist rotation of shaft 14, and thus brakes the vehicle. If greater braking is required, the operator presses pedal 105 farther leftwardly, to correspondingly shift cam 75 farther leftwardly. The circular extent of lobe 79 of the cam progressively decreases in this direction of movement (in a rightward direction as viewed in FIGS. 1b and 9), so that for example in an intermediate medium braking setting represented in FIG. 11, push rod 74 first opens valve 69 just beyond bottom dead center by engagement of surface 236a, and then closes the valve when the location 237a is reached, considerably in advance of the circular location of surface 237 of FIG. 10. Thus, a greater portion of the final part of the upstroke of the piston acts as a braking interval, and an increased braking effect is attained. When cam 75 is in its farthest leftward position, push rod 74 engages a surface 279 on the cam which has no lobe 79 at all, so that the entire upstroke of the piston is effective for braking purposes, and a maximum braking effect is attained.

When the vehicle is operating in a reverse direction, leftward movement of the pedal 105 shifts cam 75 rightwardly beyond the position of FIG. 6, to contact a decreasing circular length portion of lobe 80, which is constructed the same as lobe 79 but reversely, to attain the same result in a reverse direction. That is, as push rod 74 contacts portions of lobe 80 which are advanced farther to the left along cam 75, the push rod acts to allow closure of valve 69 prior to top dead center, and from a point which progressively advances toward bottom dead center, to attain a progressively increasing braking effect, as will be apparent from the above detailed description of the forward braking condition.

When throttle 40 is closed, and lever 85 is in either a forward or reverse travel position, the vehicle will coast without restraint so long as pedal 105 is not depressed. This is true because valve 69 is maintained open mechanically during the entire upstroke of the piston, and will open automatically against the tendency of its spring 72, and by virtue of the suction pressure developed, on the downstroke of the piston, so that the cylinder is always in communication with the atmosphere and the piston has no restraint exerted against it by virtue of the pressure effects in the cylinder.

During changes in the velocity of travel of the vehicle, and other changes in the demand for gases at engine 10, the gas generator system 16 functions automatically as controlled by pressure responsive throttle 195 to start and stop, and regulate in speed, in a manner always maintaining a substantially uniform working pressure at the inlet to engine 10. After the initial start of the gas generating unit, pressure is normally always present in accumulator 142 to restart the generator upon opening of valve 195. If at the time of opening of valve 195, piston 19 is in a portion of its cycle in which the gases from accumulator 142 will not drive it, or if there is for some reason no pressure in the accumulator, starter 218 will turn shaft 153 until the gases do drive the generator. This is true because the starter 218 and clutch 219 will always be energized through switch 214 upon opening of automatic valve 195, and will remain energized until switch 222 is opened by attainment of a predetermined speed in excess of cranking speed.

When lever 85 is in its central position (FIGS. 1 and 1b) and throttle 40 is closed, valves 50 and 69 are not actuated at all by cams 55 and 75, and therefore function simply as spring pressed check valves. During the downstroke of each piston 21, its valve 69 opens against spring tension to function as a compressor inlet valve, while on the upstroke valve 69 is closed by the pressure within the cylinder and valve 50 opens against the tendency of its spring 52. Thus air is compressed into tank 139, and the engine 10 is in a full braking condition.

Under normal driving conditions, storage tank 139 will soon become pressurized to system pressure, say 125 p.s.i. When a stop is made, the pressure in tank 139 may rise to say 140 p.s.i., as a result of which check valve 140 (FIGS. 1 and 1b), will open and check valve 194 (FIGS. 1 and 1a) will close. Compressed air may then flow from tank 139 through valve 140, line 141 and accumulator 142 to pressure controlled valve 195. Upon the next energy demand from engine 10, valve 195 will automatically open and the 140 p.s.i. air in tank 139 will be used to drive piston 19 and thereby cause the production of hot gases for engine 10. As soon as the pressure in tank 139 falls to the predetermined normal system pressure, or slightly below, check valve 194 will open, and valve 140 will close, so that piston 19 of the gas generator again receives its energy in the form of hot gases from the burning cylinder 17. Thus it can be seen that the air compressed during braking is so utilized that its potential energy of compression assists in delivering pressurized gas to the engine 10, and therefore assists in driving or accelerating the engine and vehicle.

The entire overall system disclosed in this application has been designed throughout to minimize the possibility of heat energy being lost to atmosphere without performing useful work. For this purpose I preferably provide heat insulation about all of the lines and components which carry gases at a superatmospheric temperature (such as lines 187, 37, 42, 141 and 211a, tanks 139, 142 and 146, and the various components and lines connected in series with these specified lines and tanks). Loss of heat energy is also minimized by the discussed complete and automatic stopping of the gas generator whenever there is no demand for gases at engine 10 (at stops, during coasting periods, and while decelerating the vehicle). Additionally, the design of the system is such as to avoid the necessity for extremity high temperatures at any point, so that conventional metals may be used, and so that the mentioned insulation of the heated components may be attained successfully and efficiently. Further, the flow of the exhaust gases from engine 10 and gas producer 16 through storage tank 139 transfers energy from these gases to the compressed air in the tank.

The unique design of engine 10 enables it to produce full torque at zero r.p.m., so that the engine may if desired be directly connected through an appropriate drive shaft to the wheels of the vehicle, without the interposition in the drive system of a transmission or clutch. As a result, the engine and vehicle may be very rapidly accelerated at full torque from zero r.p.m. to any desired cruising speed, and when the occasion arises may subsequently be decelerated by the engine in its braking condition to a slower speed or to a stopped condition, following which engine 10 after conversion again to its driving condition may re-accelerate the vehicle from zero r.p.m. to a desired speed, etc. Thus, complete flexibility of control is attained without the requirement for any type of transmission or clutch.

To discuss further the reasons for employment of certain portions of the illustrated apparatus in the present system, it is noted that the poppet valves have been employed in the system because of their ability to seal well, function at high temperatures, and operate with little or no lubrication. The design of both the gas producer 16 and engine 10 for complete expansion of their driving gases under normal use minimizes the exhaust noise produced by the system. Further, the discussed high starting torque of engine 10 enables it to operate normally at relatively slow speeds, with resultant maximization of the length of life of the engine. Similar extended life for the gas producer is attained because of its capacity to stop completely whenever the demand for gases at the engine is interrupted.

It should also be noted that when a final stop is made, after a trip in the vehicle, the closure of stop valve 196 by return of switch 213 to its position of engagement with contact 224 (FIG. 1a), in conjunction with the automatic closure of check valves 138 (FIG. 1b) and 194 (FIG. 1a), assures maintenance of tanks 139 and 142 in pressurized condition, so that there will normally be more than enough pressure in the system for the next start.

The fact that gas producer 16 burns with an excess of air, and the fact that the energy from that burning is wholly contained in the products of combustion, contribute much to the overall thermal efficiency of the system, which efficiency is further enhanced by the other factors discussed above, including particularly the reasonable system temperatures which may be employed, and the use in the system of air compressed during the braking operation.

I claim:

1. A work-brake assembly comprising at least one cylinder and a contained piston movable relative to the cylinder to vary the effective size of a cylinder chamber therein, a source of pressurized gas outside of said cylinder communicable with the cylinder for delivery of said gas under pressure thereto, and valve means actuable between two conditions and operable in a first of said conditions to admit said pressurized gas to said cylinder at the beginning of or during a cylinder chamber enlarging stroke of said piston relative to the cylinder, and to then discharge said gas at reduced pressure, in a relation driving the piston relative to the cylinder by the pressure energy contained in said gas prior to its delivery to the cylinder, said piston and cylinder being operable in a second condition of the valve means to draw low pressure air into the cylinder by said cylinder enlarging stroke and to compress said air on the return stroke in a relation exerting a braking action on the piston and cylinder, said valve means including a valve which acts in said first condition as a pressurized gas inlet valve and in said second condition as a compressed air outlet valve.

2. A work-brake assembly as recited in claim 1, in which said valve means include a second value which acts in said first condition as a gas outlet valve and in said second condition as a low pressure air inlet valve.

3. A work-brake assembly as recited in claim 1, including means operable in said first condition to actuate said valve in predetermined timed relation to the operation of the piston relative to the cylinder to admit said pressurized gas, and yielding means acting in said second condition to yieldingly urge said valve closed but enabling opening of the valve by said compressed air.

4. A work-brake assembly as recited in claim 1, in which said valve means include a second valve which acts in said first condition as a gas outlet valve and in said second condition as a low pressure air inlet valve, cams operable to actuate said first and second valves in said first condition, and yielding means urging said valves to closed condition and yieldingly resisting opening of the valves in said second condition.

5. A work-brake assembly as recited in claim 1, in which said valve means include a second valve which acts in said first condition as a gas outlet valve and in said second condition as a low pressure air inlet valve, a first cam operable in said first condition to open said first mentioned valve away from a coacting valve seat and in a direction outwardly away from said cylinder chamber, a spring resisting said opening movement of said first valve but enabling said opening by said compressed air for discharge thereof in said second condition, a second cam operable in said first condition to open said second valve away from a valve seat and in a direction inwardly toward said cylinder chamber, and a spring resisting opening of said second valve but enabling said opening to admit low pressure air into the cylinder chamber in said second condition.

6. A work-brake assembly as recited in claim 1, including cam means operable in said first condition to actuate said valve in predetermined timed relation to the operation of the piston relative to the cylinder to admit said pressurized gas, yielding means acting in said second condition to yieldingly urge said valve closed but enabling opening of the valve by said compressed air, a braking control member, and means for disabling said cam means to prevent actuation of said valve thereby in response to actuation of said braking control member.

7. A work-brake assembly comprising at least one cylinder and a contained piston movable relative to the cylinder to vary the effective size of a cylinder chamber therein, a source of pressurized gas outside of said cylinder communicable with the cylinder for delivery of said gas under pressure thereto, and valve means actuable between two conditions and operable in a first of said conditions to admit said pressurized gas to said cylinder at the beginning of or during a cylinder chamber enlarging stroke of said piston relative to the cylinder, and to then discharge said gas at reduced pressure, in a relation driving the piston relative to the cylinder by the pressure energy contained in said gas prior to its delivery to the cylinder, said piston and cylinder being operable in a second condition of the valve means to draw low pressure air into the cylinder by said cylinder enlarging stroke and to compress said air on the return stroke in a relation exerting a braking action on the piston and cylinder, said valve means including a valve which acts in said first condition as a gas outlet valve and in said second condition as a low pressure air inlet valve.

8. A work-brake assembly as recited in claim 7, including means operable in said first condition to actuate said valve in predetermined timed relation to the operation of the piston relative to the cylinder to discharge said reduced pressure gas from the cylinder, and yielding means acting in said second condition to yieldingly urge said valve closed but enabling opening of the valve to admit said low pressure air into the cylinder on said cylinder chamber enlarging stroke.

9. A work-brake assembly as recited in claim 7, including a cam for actuating said valve and which is driven rotatably in timed relation to the operation of said piston relative to the cylinder, cam follower means to be actuated by the cam and in turn actuate said valve, said cam being shiftable to different positions and having a first portion shaped to open said valve during said return stroke in said first condition, said cam having a second portion shiftable into engagement with the following means in said second condition and operable to open the valve during only a portion of said return stroke and to vary the length of opening thereof by shifting movement of the cam in a relation varying said braking effect, and a spring resisting opening of said valve and operable to admit air during said cylinder chamber enlarging stroke in said second condition.

10. A work-brake assembly as recited in claim 9, including a crank shaft adapted to be driven in two opposite directions, said cam having a neutral uniform diameter portion and two lobes at opposite axial sides thereof for actuating the valve when the crank shaft is turning in said two directions respectively, each of said lobes having a first portion and a second portion as defined in claim 9 with said first portions being adjacent said uniform diameter portion of the cam and said second portions being axially therebeyond and progressively decreasing in circular length.

11. A work-brake assembly as recited in claim 10, including a control unit for shifting between forward and reverse drive settings and operable to shift said cam between positions of engagement of said two first portions respectively with said follower means, and a brake actuating means operable to shift said cam beyond said last mentioned positions to engage said follower means with said second portions of the cam.

12. A work-brake assembly as recited in claim 11, in which said brake actuating means include a brake pedal, and an arm mounted pivotally to said pedal for movement therewith and relative thereto, there being means for swinging said arm relative to the brake pedal in response to movement of said control unit to a forward or reverse drive position, a generally arcuate member engageable by said arm upon said swinging movement and deflectible thereby and operable when so deflected to move one of said first portions of said cam into operative relation with said follower means, said arm being constructed to then actuate said generally arcuate member farther and to thereby move one of said second portions of the cam into operative relation with the follower means upon depression of said pedal.

13. A work-brake assembly as recited in claim 12, including an additional valve operable to function as a pressurized gas inlet valve in said first condition and as a compressed air outlet valve in said second condition, a spring resisting opening of said additional valve, an axially shiftable additional cam for opening said additional valve in said first condition and having a central neutral position and two lobes of progressively increasing circular length at opposite sides thereof for actuating said additional valve in opposite directions of rotation, and means for actuating said additional cam in opposite directions in response to movement of said control unit in opposite directions.

14. A work-brake assembly as recited in claim 13, in which said control unit includes a swinging element having an arcuately curved surface containing a notch, said means for swinging said arm including a lever having a portion projecting into said notch and deflectible in opposite directions upon swinging movement of said element and operable to swing said arm correspondingly in opposite directions.

15. A work-brake assembly as recited in claim 14, including means operable upon actuation of said brake pedal to render said additional cam ineffective to actuate said additional valve.

16. A work-brake assembly comprising at least one cylinder and a contained piston movable relative to the cylinder to vary the effective size of a cylinder chamber therein, a source of pressurized gas outside of said cylinder communicable with the cylinder for delivery of said gas under pressure thereto, and valve means actuable between two conditions and operable in a first of said conditions to admit said pressurized gas to said cylinder at the beginning of or during a cylinder chamber enlarging stroke of said piston relative to the cylinder, and to then discharge said gas at reduced pressure, in a relation driving the piston relative to the cylinder by the pressure energy contained in said gas prior to its delivery to the cylinder, said piston and cylinder being operable in a second condition of the valve means to draw low pressure air into the cylinder by said cylinder enlarging stroke and to compress said air on the return stroke in a relation exerting a braking action on the piston and cylinder, said valve means including a valve which functions in said first condition as a pressurized gas inlet valve, there being a cam for actuating said valve and which is driven rotatably in timed relation to the operation of said piston relative to the cylinder, cam follower means to be actuated by the cam and in turn actuate said valve, a crank shaft drivable in opposite rotary directions by movement of the piston relative to the cylinder, said cam being shiftable axially and having two lobes which become effective to actuate said valve in different axial settings of the cam and which actuate the valve to admit said pressurized gas at times to drive the shaft in said two opposite directions respectively, said cam having a central portion of uniform diameter between said two lobes and which when contacted by said follower means is ineffective to open the valve, said two lobes being shaped to progressively increase the length of opening of said valve in advancing away from said central portion of the cam.

17. A work-brake assembly comprising at least one cylinder and a contained piston movable relative to the cylinder to vary the effective size of a cylinder chamber therein, a source of pressurized gas outside of said cylinder communicable with the cylinder for delivery of said gas under pressure thereto, and valve means actuable between two conditions and operable in a first of said conditions to admit said pressurized gas to said cylinder at the beginning of or during a cylinder chamber enlarging stroke of said piston relative to the cylinder, and to then discharge said gas at reduced pressure, in a relation driving the piston relative to the cylinder by the pressure energy contained in said gas prior to its delivery to the cylinder, said piston and cylinder being operable in a second condition of the valve means to draw low pressure air into the cylinder by said cylinder enlarging stroke and to compress said air on the return stroke in a relation exerting a braking action on the piston and cylinder, said valve means including a valve which functions in said second condition as a low pressure air inlet valve, there being means for opening said inlet valve during a variable length portion of said return stroke to thereby vary the effective compression stroke and correspondingly vary said braking effect.

18. A work-brake assembly as recited in claim 17, in which said valve opens away from a seat and in a direction toward the cylinder chamber, there being a spring yieldingly urging said valve in a closing direction, said means for opening the valve being cam means operable to open said valve against the tendency of said spring during said variable length portion of said return stroke.

19. A work-brake system comprising a piston and cylinder mechanism including at least one cylinder and at least one piston, said mechanism being convertible between an engine condition in which it is driven by gases in its cylinder or cylinders and a braking condition in which it functions to compress gas in the cylinder or cylinders and thereby exert a braking force, and a gas generator for burning fuel and delivering the gases of combustion to said piston and cylinder mechanism to drive it in said engine condition, said generator including means utilizing the energy of said gas which is compressed in said piston and cylinder mechanism in said braking condition to assist in producing said gases of combustion for driving the mechanism in said engine condition, said gas generator including a second piston and cylinder mechanism within which said fuel is burned and from which the gases of combustion are delivered to said first mentioned piston and cylinder mechanism, a third piston and cylinder mechanism driven by gas pressure and operable to drive said second mechanism reciprocably, means for returning a portion of the gases of combustion produced in said second mechanism to said third mechanism to power it, and means for delivering said gas compressed in the first piston and cylinder mechanism to said third mechanism to assist in powering it, said last mentioned means including a container for receiving and storing said gas compressed in said first mechanism, and heat exchanger means for passing heated exhaust gases from said first mechanism in its engine condition, or from said third mechanism, in heat exchange relation to said gas compressed in said first mechanism to heat it.

20. A work-brake system comprising a piston and cylinder mechanism including at least one cylinder and at least one piston, said mechanism being convertible between an engine condition in which it is driven by gases in its cylinder or cylinders and a braking condition in which it functons to compress gas in the cylinder or cylinders and thereby exert a braking force, and a gas generator for burning fuel and delivering the gases of combustion to said piston and cylinder mechanism to drive it in said engine condition, said generator including means utilizing the energy of said gas which is compressed in said piston and cylinder mechanism in said braking condition to assist in producing said gases of combustion for driving the mechanism in said engine condition, said gas generator including a second piston and cylinder mechanism within which said fuel is burned and from which the gases of combustion are delivered to said first mentioned piston and cylinder mechanism, a third piston and cylinder mechanism driven by gas pressure and operable to drive said second mechanism reciprocably, means for returning a portion of the gases of combustion produced in said second mechanism to said third mechanism to power it, means for delivering said gas compressed in the first piston and cylinder mechanism to said third mechanism to assist in powering it, a throttle for regulating the flow of said gases of combustion to said first mechanism, and an automatic valve for regulating the delivery of gas to said third mechanism in response to variations in the pressure of said gases of combustion from the second mechanism and in a relation regulating the speed of operation of said third mechanism and also starting and stopping it as necessary to maintain said gases of combustion at an essentially uniform pressure.

21. A work-brake system comprising a piston and cylinder mechanism including at least one cylinder and at least one piston, said mechanism being convertible between an engine condition in which it is driven by gases in its cylinder or cylinders and a braking condition in which it functions to compress gas into the cylinder or cylinders and thereby exert a braking force, and a gas generator for burning fuel and delivering the gases of combustion to said piston and cylinder mechanism to drive it in said engine condition, said generator including means utilizing the energy of said gas which is compressed in said piston and cylinder mechanism in said braking condition to assist in producing said gases of combustion for driving the mechanism in said engine condition, said gas generator including a second piston and cylinder mechanism within which said fuel is burned and from which the gases of combustion are delivered to said first mentioned piston and cylinder mechanism, a third piston and cylinder mechanism driven by a gas pressure and operable to drive said second mechanism reciprocably, means for returning a portion of the gases of combustion produced in said second mechanism to said third mechanism to power it, means for delivering said gas compressed in the first piston and cylinder mechanism to said third mechanism to assist in powering it, a starter for starting said third mechanism, a pressure responsive control unit responsive to a drop in pressure of said gases of combustion, a valve for controlling the delivery of gases to said third mechanism and operable by said control unit to admit gases to said third mechanism upon said drop in pressure of the gases of combustion from said second mechanism, and means also responsive to said drop in pressure to actuate said starter.

22. A work-brake assembly comprising at least one cylinder and a contained piston movable relative to the cylinder to vary the effective size of a cylinder chamber therein, a source of pressurized gas outside of said cylinder communicable with the cylinder for delivery of said gas under pressure thereto, and valve means actuable between two conditions and operable in a first of said conditions to admit said pressurized gas to said cylinder at the beginning of or during a cylinder chamber enlarging stroke of said piston relative to the cylinder, and to then discharge said gas at reduced pressure, in a relation driving the piston relative to the cylinder by the pressure energy contained in said gas prior to its delivery to the cylinder, said piston and cylinder being operable in a second condition of the valve means to draw low pressure air into the cylinder by said cylinder enlarging stroke and to compress said air on the return stroke in a relation exerting a braking action on the piston and cylinder, said valve means including a valve and a cam for actuating said valve and which is driven rotatably in timed relation to the operation of said piston relative to the cylinder, cam follower means to be actuated by the cam and in turn actuate said valve, a crank shaft drivable in opposite rotary directions by movement of the piston relative to the cylinder, said cam being shiftable axially and having two differently shaped lobes which become effective to actuate said valve in two different axial settings of the cam respectively and which actuate the valve to open and close at predetermined different intervals in two different reverse direction conditions respectively of the work-brake assembly.

23. A work-brake system comprising a piston and cylinder mechanism including at least one cylinder and at least one piston, said mechanism being convertible between an engine condition in which it is driven by gases in its cylinder or cylinders and a braking condition in which it functions to compress gas in the cylinder or cylinders and thereby exert a braking force, and a gas generator for burning fuel and delivering the gases of combustion to said piston and cylinder mechanism to drive it in said engine condition, said generator including means utilizing the energy of said gas which is compressed in said piston and cylinder mechanism in said braking condition to assist in producing said gases of combustion for driving the mechanism in said engine condition, said gas generator including a second piston and cylinder mechanism within which said fuel is burned and from which the gases of combustion are delivered to said first mentioned piston and cylinder mechanism, and a third piston and cylinder mechanism for driving said second mechanism reciprocably and which is in turn at least partially driven by the gas compressed in said first piston and cylinder mechanism.

24. A work-brake system comprising a piston and cylinder mechanism including at least one cylinder and at least one piston, said mechanism being convertible between an engine condition in which it is driven by gases in its cylinder or cylinders and a braking condition in which it functions to compress gas in the cylinder or cylinders and thereby exert a braking force, and a gas generator for burning fuel and delivering the gases of combustion to said piston and cylinder mechanism to drive it in said engine condition, said generator including means utilizing the energy of said gas which is compressed in said piston and cylinder mechanism in said braking condition to assist in producing said gases of combustion for driving the mechanism in said engine condition, said gas generator including a second piston and cylinder mechanism within which said fuel is burned and from which the gases of combustion are delivered to said first mentioned piston and cylinder mechanism, a third piston and cylinder mechanism driven by gas pressure and operable to drive said second mechanism reciprocably, means for returning a portion of the gases of combustion produced in said second mechanism to said third mechanism to power it, and means for delivering said gas compressed in the first piston and cylinder mechanism to said third mechanism to assist in powering it.

25. A work-brake system as recited in claim 24, including a pressure relief valve for preventing the delivery of said gases of combustion from said second mechanism to said first mechanism until a predetermined pressure has been attained, said second mechanism being capable of delivering said gases of combustion to said third mechanism even though said predetermined pressure has not been attained.

26. Apparatus comprising a piston and cylinder mechanism including at least one cylinder and at least one piston reciprocable relative thereto by pressurized gas, a source of pressurized gas for driving said mechanism, an inlet valve for admitting said gas to the cylinder at a time to cause relative motion of the piston in a cylinder chamber enlarging direction, an outlet valve for discharging said gas from the cylinder on the return stroke of the piston relative to the cylinder, and means for varying the portions of a cycle of said piston during which said valves are open, said last mentioned means including two rotary cams, timed to turn together, for actuating said two valves respectively, and each of which is shiftable axially and has a non-uniform cross section causing the cam, upon axial movement, to vary the portion of said cycle during which a corresponding one of said valves is open, each of said rotary cams having two lobes of varying cross section and of essentially opposite effective configuration for actuating the valve in opposite direction conditions, said two lobes being spaced axially apart to form a portion therebetween where the valve is not actuated and the mechanism is stopped.

References Cited

UNITED STATES PATENTS

| 908,033 | 12/1908 | Peterson | 60—17 |
|---|---|---|---|
| 969,756 | 9/1910 | Sweigart | 60—17 X |
| 1,059,533 | 4/1913 | Finch | 60—61 |
| 1,301,614 | 4/1919 | Snyder | 60—17 |
| 1,331,787 | 2/1920 | Schlatter | 230—41 X |
| 1,360,122 | 10/1920 | Leidich | 60—61 |
| 1,847,260 | 3/1932 | Pardee | 230—41 X |
| 2,003,456 | 6/1935 | Nardone | 230—41 X |
| 2,201,682 | 5/1940 | Johansson | 60—15 |
| 740,203 | 9/1903 | Thomson | 91—187 X |
| 1,289,498 | 12/1918 | McHarry. | |
| 2,020,923 | 11/1935 | Von Seggern | 91—187 X |

FOREIGN PATENTS 23,292   10/1912   Great Britain.

CARROLL B. DORITY, JR., *Primary Examiner.*

U.S. Cl. X.R.

60—18, 58, 59, 61; 91—187; 230—41; 123—97, 90